(12) United States Patent
Hanner (10) Patent No.: US 8,000,721 B2
(45) Date of Patent: Aug. 16, 2011

(54) WIRELESS COMMUNICATION TERMINALS AND METHODS THAT DISPLAY RELATIVE DIRECTION AND DISTANCE THEREBETWEEN RESPONSIVE TO ACCELERATION DATA

(75) Inventor: Christian Thomas Hanner, Solna (SE)

(73) Assignee: Sony Ericsson Mobile Communications AB (SE)

( * ) Notice: Subject to any disclaimer, the term of this patent is extended or adjusted under 35 U.S.C. 154(b) by 827 days.

(21) Appl. No.: 12/039,989

(22) Filed: Feb. 29, 2008

(65) Prior Publication Data

US 2009/0221298 A1 Sep. 3, 2009

(51) Int. Cl.
*H04W 24/00* (2009.01)
(52) U.S. Cl. ............... 455/456.1; 455/457; 455/41.1
(58) Field of Classification Search ....... 455/456.1–457; 340/825.49
See application file for complete search history.

(56) References Cited

U.S. PATENT DOCUMENTS

| | | | |
|---|---|---|---|
| 5,828,770 | A | 10/1998 | Leis et al. |
| 6,246,376 | B1 | 6/2001 | Bork et al. |
| 2002/0102990 | A1 | 8/2002 | Alberth, Jr. et al. |
| 2003/0045998 | A1 | 3/2003 | Medl |
| 2004/0021569 | A1 | 2/2004 | Lepkofker et al. |
| 2004/0048571 | A1 | 3/2004 | Kiyose |
| 2004/0056798 | A1 | 3/2004 | Schmidt |
| 2004/0087314 | A1* | 5/2004 | Duncan ............ 455/456.1 |
| 2006/0276205 | A1* | 12/2006 | Bengtsson ........... 455/457 |
| 2007/0021065 | A1* | 1/2007 | Sengupta et al. ...... 455/41.2 |
| 2007/0087773 | A1* | 4/2007 | Yoon et al. ........... 455/522 |

FOREIGN PATENT DOCUMENTS

| | | |
|---|---|---|
| EP | 1 808 673 A1 | 7/2007 |
| WO | WO 2007/023447 A1 | 3/2007 |

OTHER PUBLICATIONS

Invitation to Pay Additional Fees and, Where Applicable, Protest Fee, PCT International Application No. PCT/IB2008/002285, Feb. 24, 2009.
Notification of Transmittal of the International Search Report and the Written Opinion of the International Searching Authority, or the Declaration; International Search Report; Written Opinion of the International Searching Authority, PCT International Application No. PCT/IB2008/002285, Jun. 3, 2009.

\* cited by examiner

*Primary Examiner* — Lester Kincaid
*Assistant Examiner* — Daniel Lai
(74) *Attorney, Agent, or Firm* — Myers Bigel Sibley & Sajovec, PA (57) ABSTRACT

Wireless communication terminals are disclosed that display the direction and distance between them so that users can, for example, travel away from each other and then later find one another. The terminals are configured to track their movement using acceleration data. Some of the terminals may operate as slave terminals in which they transmit their movement data to a master terminal which determines therefrom the relative direction and distance between the terminals. The master terminal may then transmit the relative direction and distance data to the slave terminals where it can be displayed to their users.

10 Claims, 5 Drawing Sheets

WIRELESS COMMUNICATION TERMINALS AND METHODS THAT DISPLAY RELATIVE DIRECTION AND DISTANCE THEREBETWEEN RESPONSIVE TO ACCELERATION DATA

BACKGROUND OF THE INVENTION

The present invention relates to the field of wireless communications in general and more particularly, to determining the location of wireless communication terminals.

Many communication terminals, such as cellular communication terminals, personal digital assistants (PDAs), laptop computers, and the like, are now equipped with Global Positioning System (GPS) receivers to enable users to determine their location. GPS is a space-based radio triangulation system using a constellation of satellites in orbit around the Earth. A GPS receiver triangulates its position based on timing of radio signals it receives from various ones of the satellites and the known location of those satellites.

Determining the position of a GPS receiver typically requires the acquisition of a set of navigational parameters from the navigational data signals of four or more GPS satellites. The algorithms that are used to acquire GPS signals and determine position therefrom are complex and require substantial processing throughput. The process of monitoring GPS signals can be significantly affected by environmental factors. For example, GPS signals that may be easily acquired in the open typically become harder or impossible to acquire when a receiver is within a building, a vehicle, and/or under foliage.

The process to acquire GPS signals can take several minutes depending upon how much acquisition information a GPS receiver has initially. In order to improve GPS receiver performance, techniques have been developed to provide GPS receivers with GPS acquisition assistance information, e.g., time and position estimates, satellite ephemeris and clock information, and a visible satellite list from a terrestrial cellular communication system, which can enable a GPS receiver to expedite its acquisition of GPS signals and associated position determination.

As can be appreciated, incorporating a GPS receiver and associated processing circuitry into a wireless terminal can greatly increase its cost and complexity. This cost and complexity further increases when the wireless terminal is further configured to receive and use GPS acquisition assistance information from a cellular communication system.

SUMMARY OF THE INVENTION

Various embodiments of the present invention provide wireless communication terminals that display the direction and distance between them so that users can, for example, travel away from each other and then later find one another. The terminals are configured to track their movement using acceleration data. Some of the terminals may operate as slave terminals in which they transmit their movement data to a master terminal which determines therefrom the relative direction and distance between the terminals. The master terminal may then transmit the relative direction and distance data to the slave terminals where it can be displayed to their users.

According to some embodiments, a first wireless communication terminal, which may correspond to a slave terminal, includes a display device, a wireless transceiver, at least one accelerometer, and a controller. The wireless transceiver is configured to communicate through an air interface with a second wireless communication terminal. The at least one accelerometer is configured to generate acceleration data responsive to movement of the first terminal. The controller is configured to generate movement data from the acceleration data that tracks movement of the first terminal, to communicate the movement data to the second terminal, to receive relative direction and distance data from the second terminal, and to respond thereto by causing an indication of direction and/or distance between the first and second terminals to be displayed on the display device.

In some further embodiments, the controller is further configured to respond to activation of a terminal tracking mode by causing an orientation pattern to be displayed.

In some further embodiments, the first terminal can include a plurality of light sources configured to generate a defined orientation light pattern which indicates a present orientation of the first terminal for use by the second terminal for determining relative orientation between the first and second terminals. The controller can be further configured to turn on the plurality of light sources in response to activation of the terminal tracking mode.

In some further embodiments, the plurality of light sources are configured to emit light from spaced apart asymmetrical peripheral locations on a same side of the first terminal to generate an asymmetrical light pattern from the first terminal.

In some further embodiments, the controller is further configured to respond to activation of the terminal tracking mode by causing a defined orientation pattern that indicates a present orientation of the first terminal to be displayed on the display device for use by the second terminal for determining relative orientation between the first and second terminals.

In some further embodiments, the wireless transceiver includes a wireless local area network (WLAN) transceiver and a cellular transceiver. The controller is further configured to repetitively communicate the movement data to the second terminal through the WLAN transceiver while a WLAN communication link to the second terminal is available, and to respond to loss of the WLAN communication link by repetitively generating discrete text messages containing the movement data and communicating the text messages through the cellular transceiver to the second terminal.

In some further embodiments, the controller is further configured to repetitively communicate the movement data to the second terminal at a first repetition rate through the WLAN transceiver while the WLAN communication link is available, and to respond to loss of the WLAN communication link by repetitively generating and communicating the text messages containing the movement data through the cellular transceiver at a second repetition rate that is less than the first repetition rate.

In some further embodiments, the controller is further configured to determine speed of the movement of the first terminal, and to regulate the second repetition rate at which the text messages containing the movement data are generated and communicated in response to the determined speed.

In some further embodiments, the wireless transceiver includes a wireless local area network (WLAN) transceiver and a cellular transceiver, and the controller is further configured to repetitively communicate the movement data to the second terminal through the WLAN transceiver at a first repetition rate while a WLAN communication link to the second terminal is available, and to respond to loss of the WLAN communication link by generating a message containing the movement data and communicating the message through the cellular transceiver to the second terminal each time the first terminal is determined to have moved at least a threshold distance from a location of the previous communicated message containing the movement data.

In some other embodiments, a first wireless communication terminal, which may correspond to a master terminal, includes a display device, a wireless transceiver, at least one accelerometer, and a controller. The wireless transceiver is configured to communicate through an air interface with a second wireless communication terminal. The at least one accelerometer is configured to generate acceleration data responsive to movement of the first terminal. The controller is configured to generate movement data from the acceleration data that tracks movement of the first terminal, to receive movement data from the second terminal that tracks movement of the second terminal, to combine the movement data for the first and second terminals to generate relative direction and distance data between the first and second terminals, and to cause an indication of direction and/or distance between the first and second terminals to be displayed on the display device.

In some further embodiments, the terminal further includes an image sensor. The controller is configured to detect orientation of a defined pattern on the second terminal within image data from the image sensor, and to determine relative orientation between the first and second terminals responsive to the detected orientation of the defined pattern on the second terminal.

In some further embodiments, the controller is configured to detect orientation of a light pattern emitted by the second terminal within image data from the image sensor, and to determine relative orientation between the first and second terminals responsive to the detected orientation of the light pattern.

In some further embodiments, the controller is configured to detect orientation of a pattern displayed on a display device of the second terminal within image data from the image sensor, and to determine relative orientation between the first and second terminals responsive to the detected orientation of the displayed pattern on the second terminal.

In some further embodiments, the controller is further configured to transmit the relative direction and distance data to the second terminal.

In some further embodiments, the wireless transceiver includes a WLAN transceiver and a cellular transceiver, and the controller is further configured to repetitively communicate the relative direction and distance data to the second terminal through the WLAN transceiver while a WLAN communication link to the second terminal is available, and to respond to loss of the WLAN communication link by repetitively generating discrete text messages containing the relative direction and distance data and communicating the text messages through the cellular transceiver to the second terminal.

In some further embodiments, the controller is further configured to repetitively communicate the relative direction and distance data to the second terminal at a first repetition rate through the WLAN transceiver, and, in response to loss of the WLAN communication link, to repetitively generate and communicate the text messages containing the relative direction and distance data through the cellular transceiver at a second repetition rate that is less than the first repetition rate.

In some further embodiments, the controller is further configured to determine speed of the movement of the first terminal, and to regulate the second repetition rate at which the text messages containing the relative direction and distance data are communicated in response to the determined speed.

In some further embodiments, the controller is further configured to determine signal strength for a received signal carrying the acceleration data from the second terminal, to estimate distance between the first and second terminals in response to a defined relationship between a known strength of the signal transmitted by the second terminal and the received signal strength, and to use the estimated distance to increase accuracy of the relative direction and distance data that is generated using the movement data for the first and second terminals.

Some other embodiments are directed to a method that includes, at a first wireless communication terminal, generating movement data from acceleration data that tracks movement of the first terminal. Further, at the first terminal, movement data is received from a second wireless communication terminal that tracks movement of the second terminal. Further, at the first terminal, the movement data for the first and second terminals is combined to generate relative direction and distance data between the first and second terminals. An indication of direction and/or distance between the first and second terminals is displayed at the first terminal.

In some further embodiments, the method further includes detecting orientation of a defined pattern on the second terminal within image data from an image sensor in the first terminal. The relative orientation between the first and second terminals is determined responsive to the detected orientation of the defined pattern on the second terminal. The relative direction and distance data are repetitively communicated to the second terminal at a first repetition rate through a WLAN transceiver in the first terminal while a WLAN communication link to the second terminal is available. In response to loss of the WLAN communication link, discrete text messages containing the relative direction and distance data are repetitively generated and communicated as text messages through a cellular transceiver in the first terminal to the second terminal at a second repetition rate that is less than the first repetition rate. The second repetition rate at which the text messages containing the relative direction and distance data are communicated is regulated in response to speed of the movement of the first terminal and/or in response to determining that the first terminal has moved at least a threshold distance from a location of the previous communicated message containing the movement data.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

As used herein, a "wireless communication terminal" or abbreviated "terminal" includes, but is not limited to, any electronic device that is configured to transmit/receive communication signals with a long range wireless interface such as, for example, a cellular interface, and/or via a short range wireless interface such as, for example, a Bluetooth wireless interface, a wireless local area network (WLAN) interface such as IEEE 801.11a-g, and/or another radio frequency (RF) interface. Example terminals include, but are not limited to, a cellular phone, PDA, and mobile computers that are configured to communicate with another terminal via a cellular network and/or over a Bluetooth interface, WLAN interface, and/or another RF interface.

In accordance with various embodiments of the present invention, two or more terminals display the direction and distance between them so that users can, for example, travel away from each other and then later find one another. The terminals are configured to track their movement using acceleration data. Some of the terminals may operate as slave terminals in which they transmit their movement data to a master terminal which determines therefrom the relative direction and distance between the terminals. The master terminal then transmits the relative direction and distance data to the slave terminals where it is displayed to their users.

Accordingly, the master terminal is configured with algorithms and processing capabilities to determine the relative direction and distance between the master terminal and one or more slave terminals and to display the relative direction and distance to a user, and may be further configured to communicate the relative direction and distance data to the slave terminals. In sharp contrast, the slave terminals can have substantially less circuitry complexity than the master terminal and may, for example, be configured to transmit their individual movement data to the master terminal and not have a display, receiver circuitry, and other circuitry for determining, receiving, or displaying relative direction and distance to the master terminal. Accordingly, a slave terminal may be a relatively simple and inexpensive movement tracking device with a wireless transmitter. In some other embodiments described below, a slave terminal can receive the relative direction and distance data from a master terminal and can display that data to enable a user thereof to navigate to the master terminal.

Figure 1:
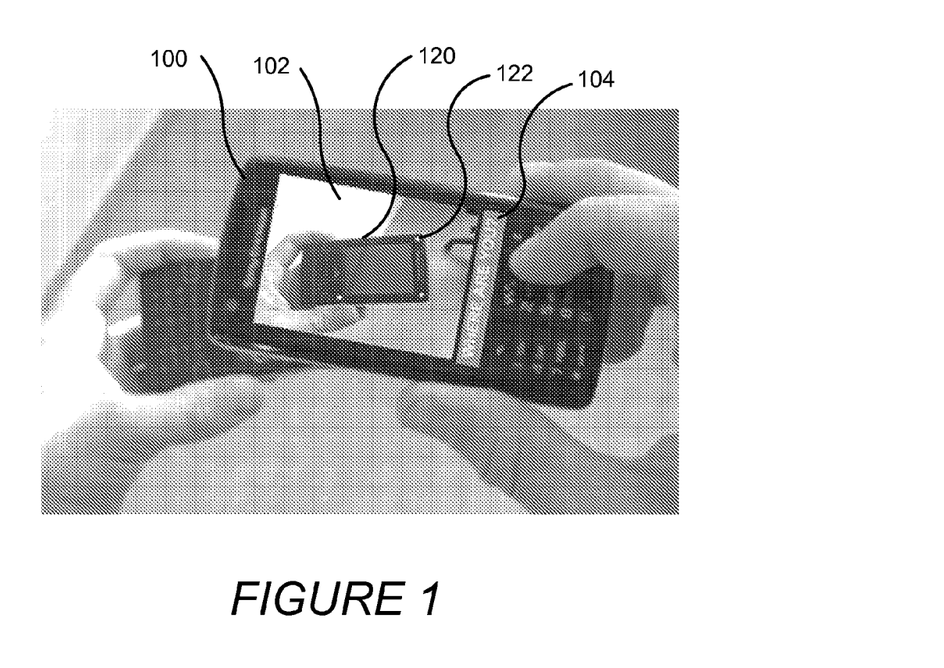
FIG. 1 illustrates a wireless communication terminal that is operating in a tracking mode to sense orientation indicia on another wireless communication terminal and determine therefrom the relative orientation between the terminals in accordance with some embodiments of the present invention.

FIG. 1 illustrates a first wireless communication terminal 100 and a second wireless communication terminal 120 that are operating in a tracking mode. In response to a user commanding the first and second terminals 100 and 120 to activate the tracking mode, an alignment initialization process causes a display device 102 in the first terminal 100 to display a message (e.g., "where are you?") that confirms activation of the tracking mode and indicates to the user that the relative positions and directional orientation of the first and second terminals 100 and 120 need to be initialized.

To initialize their relative positions and directional orientation, the first and second terminals 100 and 120 may be brought into close proximity to one another in a predefined relative orientation, and at which time a user can trigger initialization of an initial distance and orientation between the first and second terminals 100 and 120. Movement from that location can then be tracked using acceleration data. For example, the first and second terminals 100 and 120 can be stacked on one another and oriented so that their respective top and bottom surfaces are aligned, and a user can press a button on the first/second terminal 100/120 to trigger initialization. Alternatively, as will be described below, the first terminal 100 can use an image sensor to sense and use the initial orientation between the first and second terminals 100 and 120.

Figure 2:
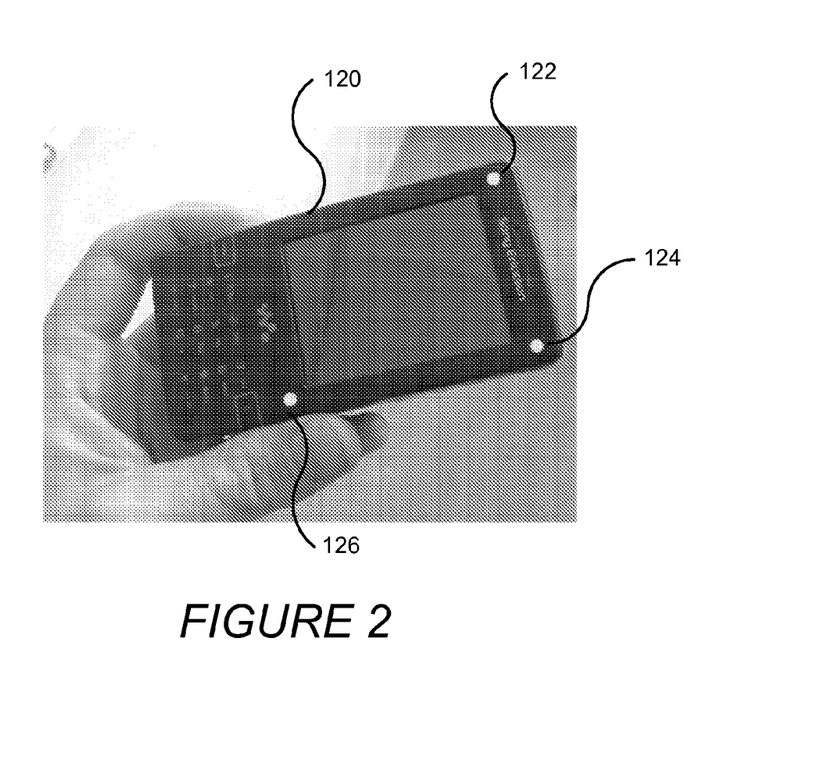
FIG. 2 illustrates a wireless communication terminal that is operating in a tracking mode and emits light from three light sources to form an orientation light pattern that can be used by another wireless communication terminal to determine the relative orientation there between in accordance with some embodiments of the present invention.

Referring to FIG. 1, the first and second terminals 100 and 120 can be brought into close proximity to one another. The second terminal 120 generates a defined orientation light pattern which indicates a present orientation of the second terminal 120 (e.g., indicates a direction of the top of the terminal). FIG. 2 illustrates a closer view of the second terminal 120 which includes three light sources 122, 124, and 126 (e.g., light emitting diodes) that are spaced apart asymmetrically along peripheral locations on a same side of the second terminal 120. In response to entering an alignment initialization process of the terminal tracking mode, the light sources 122, 124, and 126 are turned-on to generate an orientation light pattern which is sensed by the first terminal 100 and used to determine a relative orientation between the first and second terminals 100 and 120.

The first terminal 100 includes an image sensor, such as a camera, and is configured to detect, within image data from the image sensor, the orientation of the light pattern generated by the second terminal 120. The first terminal 100 uses the orientation of the detected light pattern to determine the initial relative orientation (e.g., relative directional angle) between the first and second terminals 100 and 120. In the present example, the first terminal 100 detects that the first and second terminals 100 and 120 are pointed in nearly opposite directions at some determined angle. The terminal 100 determines the initial relative orientation between the terminals 100 and 120 from the detected orientation light pattern, and tracks its movement (including rotational and distance movement) relative to that initial relative orientation. By configuring the first terminal 100 to automatically detect the relative orientation between the first and second terminals 100 and 120, the directional and distance determinations that are carried out during the tracking mode may be less prone to user error (e.g., user misalignment of the terminals during orientation initialization) and may result in the users' perceiving the tracking mode as being less complex to use.

It is to be understood that although the second terminal 120 has been illustrated with three light sources spaced apart along peripheral locations, the invention is not limited thereto and may instead include any number of light sources or other detectable characteristic (e.g., color differences/shading markings on the terminal housing) that can be used by the first terminal 100 to determine a present orientation of the second terminal 120 relative to the first terminal 100.

Figure 3:
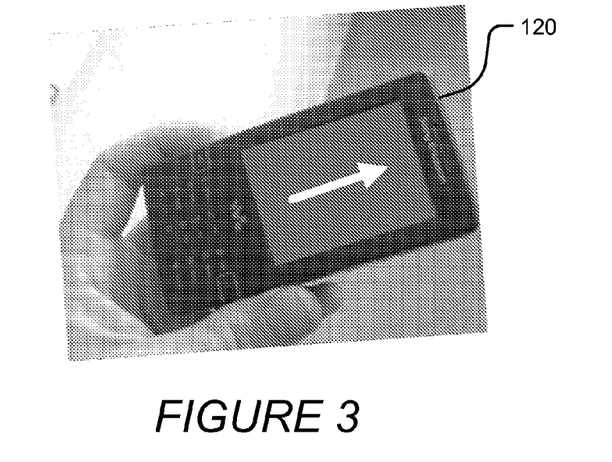
FIG. 3 illustrates another wireless communication terminal that is operating in a tracking mode and displays a defined orientation pattern that indicates a present orientation of the terminal to another wireless communication terminal in accordance with some embodiments of the present invention.

For example, the second terminal 120 shown in FIG. 3 displays a directional arrow that is always pointed toward a top surface of the second terminal 120 during the alignment initialization process. The first terminal 100 can sense and use the directional arrow displayed on the second terminal 120 to determine the initial relative orientation between the first and second terminals 100 and 120.

After initializing the relative orientation, the first and second terminals 100 and 120 can be moved therefrom while cooperatively sharing movement data, which is generated using accelerometer data, to track the distance and direction between the first and second terminals 100 and 120. Persons can therefore use the tracking mode of the first and second terminals 100 and 120 to travel away from each other and then later find one another.

Figure 4:
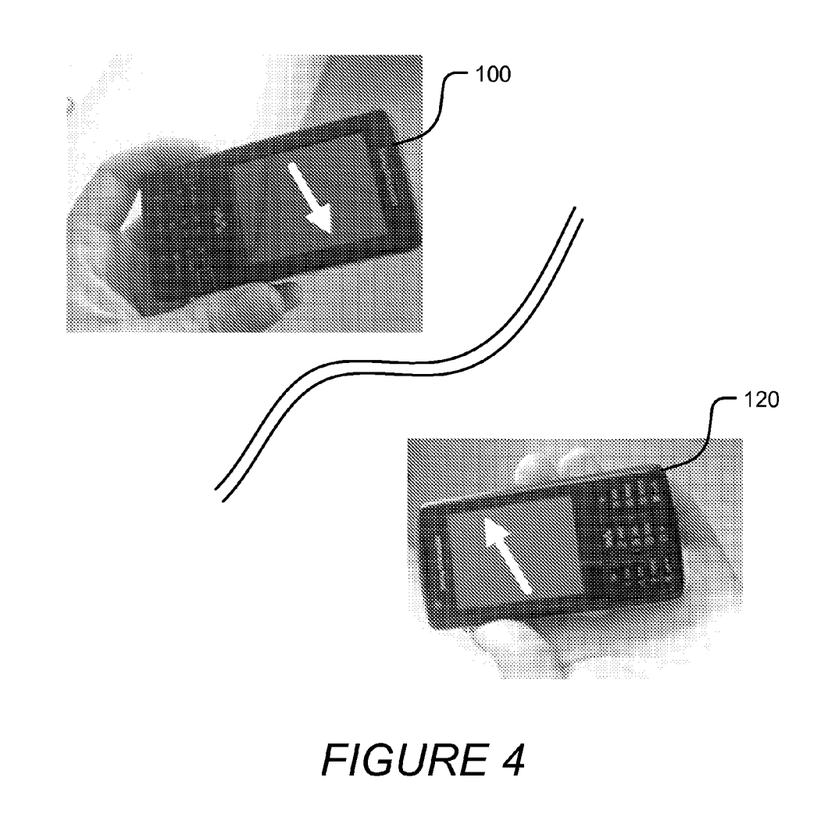
FIG. 4 illustrates a pair of wireless communication terminals that are operating in a tracking mode and which display directional arrows that are dynamically updated to point toward one another in accordance with some embodiments of the present invention.

In the exemplary embodiment shown in FIG. 4, the first and second terminals 100 and 120 display directional arrows that respectively point toward the other terminal and which are dynamically updated as one or both of the terminals 100 and 120 are moved. One or both of the terminals 100 and 120 may also display an indication of the distance between the first and second terminals 100 and 120. The distance may be displayed as a numerical value and/or it may be graphically indicated by scaling the size of and/or varying the color of the displayed directional arrows and/or other indicia that are displayed on one or both of the first and second terminals 100 and 120. The displayed distance and direction may be rendered so as to indicate to the operators the two-dimensional or three-dimensional distance and direction between the terminals 100 and 120. For example, the directional arrows may rotate clockwise and counterclockwise as the terminals 100 and 120 move around one another, and may further rotate upward and downward and/or change to different defined colors as the terminals 100 and 120 move upward and downward relative to one another (e.g., when one terminal moves to a building floor above or below the other terminal).

For example, the first and second terminals 100 and 120 may increase/decrease the displayed size of the directional arrows and/or increase/decrease the size of an icon that represents the other terminal as the first and second terminals 100 and 120 are moved closer together and, correspondingly, decrease/increase the displayed size of the indicia as the first and second terminals 100 and 120 are moved further apart.

Figure 5:
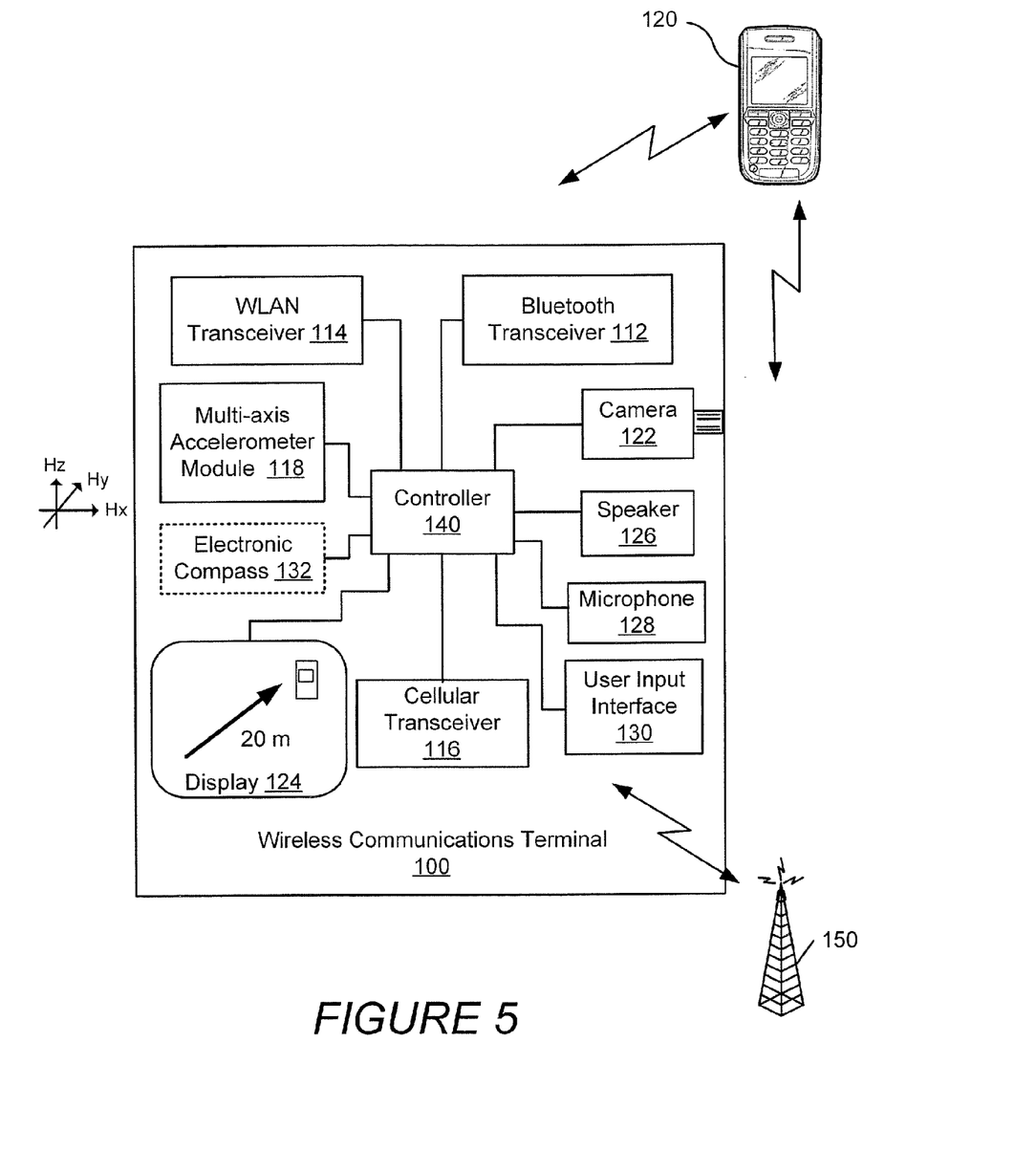
FIG. 5 is a block diagram that illustrates a wireless communication terminal that is configured to operate in a tracking mode in accordance with some embodiments of the invention.

FIG. 5 is a block diagram that illustrates an exemplary embodiment of the terminal 100. Referring to FIG. 5, the terminal 100 can include a plurality of transceivers, such as a Bluetooth transceiver 112, a WLAN transceiver 114 (e.g., compliant with one or more of the IEEE 801.11a-g standards), and a cellular transceiver 116.

The cellular transceiver 116 can be configured to communicate using one or more cellular communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS).

The first terminal 100 can thereby communicate with a similarly configured second terminal 120 over short ranges, which may be less than about 100 meters when using a WLAN communication link through the WLAN transceiver 114 or less than about 10 meters when using a Bluetooth communication link through the Bluetooth transceiver 112. The first terminal can further communicate with the second terminal 120 over much greater ranges using the cellular transceiver 116 communicating through one or more cellular transceiver base stations 150.

The transceivers 112, 114, and 116 typically include both a transmitter and a receiver to allow bi-directional communications, but the present invention is not limited to such transceivers and, as used herein, a "transceiver" may include only a receiver or a transmitter pursuant to various embodiments described herein.

A multi-axis accelerometer module 118 can include a plurality of accelerometer sensors that are arranged to measure acceleration and rotation along a plurality of orthogonal axes, such as along the illustrated horizontal axes Hx and Hy and the vertical axis Hz. A camera 122 or other image sensor generates image data that can be used to detect an orientation light pattern or other indicia on the second terminal 120 and to determine therefrom the initial orientation between the first and second terminals 100 and 120. A display 124 is configured to display an indication of the direction and distance to the second terminal 120, such by controlling the illustrated arrow to pointing toward the second terminal 120 (represented by the displayed graphical icon) and a numerical value for the distance (e.g. "20 m").

The terminal 100 may further include a speaker 126, a microphone 128, and a user input interface 130. An electronic compass 132 may be provided that generates directional data that can be used to track rotation of the terminal 100 and which may be combined with the accelerometer data to improve tracking of movement of the terminal 100. A controller 140 is configured to integrate the functionality of the other components and to carry out one or more operations described herein for tracking movement of the terminal 100 and for determining and displaying the relative direction and distance between the first and second terminals 100 and 120.

The controller 140 is configured to integrate acceleration data from the accelerometer module 118 over time (e.g., double integration over time) to determine the distance and direction that the terminal 100 has moved from the initialized location. The controller 140 may further combine directional data from the electronic compass 132 with the acceleration data to increase the accuracy with which it tracks the terminal's movement. The controller 140 receives movement data from the second terminal 120, and combines that movement data with its internally generated movement data to determine and display the relative distance and direction between the first and second terminals 100 and 120. As will be described further below, the controller 140 can further transmit the determined relative direction and distance to the second terminal 120 for display thereon so that a person can similarly use the second terminal 122 to navigate toward the first terminal 100.

In some further embodiments, the controller 140 may measure the distance between the first and second terminals 100 and 120 in response to the strength of wireless signals that are received from the second terminal 120. The controller 140 may estimate the distance using a defined relationship between an expected strength of the signal transmitted by the second terminal 120 and the strength of the signal that is received by first terminal 100. For example, a Bluetooth transceiver and/or a WLAN transceiver within the second terminal 120 can be expected to transmit with a relatively constant signal strength. Accordingly, a relationship can be defined by which the controller 140 can determine the distance between the first and second terminals 100 and 120 in response to the expected strength of the second terminal's transmitted signal and the strength of the signal that is received by the Bluetooth transceiver 112 and/or the WLAN transceiver 114. Based on the transmission pattern and associated gain of the transmitting antenna and the receiving antenna, the transmitted and received signal strength may be related by the distance squared or the distance cubed. The distance that is measured based on received signal strength can be combined with the movement data that is generated in response to the acceleration data to improve the accuracy with which the distance and direction are determined between the first and second terminals 100 and 120.

Figure 6:
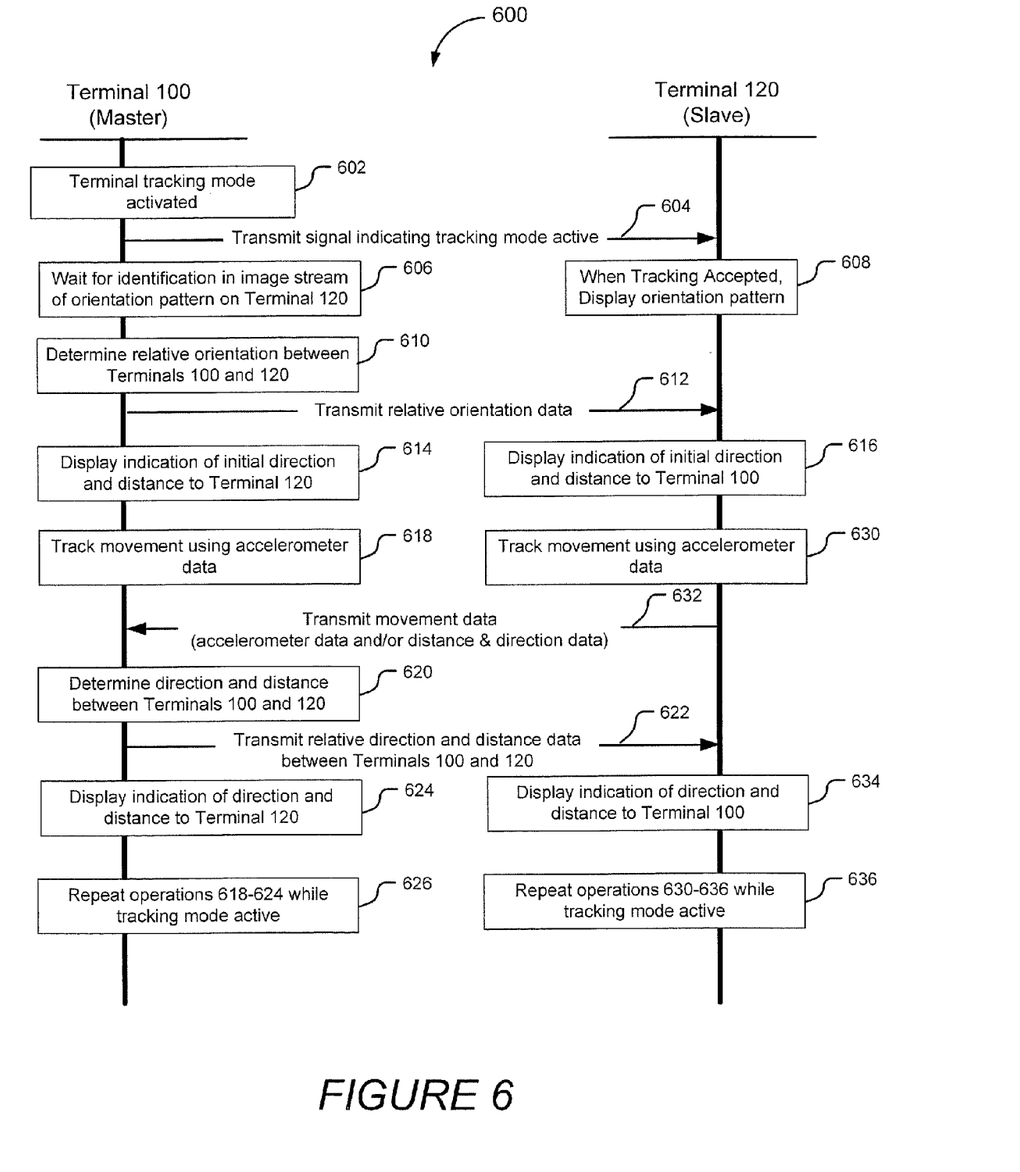
FIG. 6 is a flowchart and data flow diagram showing exemplary operations of a pair of wireless communication terminals that cooperatively determine the relative direction and distance between the terminals using acceleration data in accordance with some embodiments of the invention.

FIG. 6 is a flowchart and data flow diagram showing exemplary operations 600 that can be carried out by the first and second terminals 100 and 120 while they are operating in a tracking mode to cooperatively determine the relative direction and distance between them. Referring to FIG. 6, in response to a user activating a tracking mode (operation 602), the first terminal 100 transmits a signal (operation 604) to the second terminal 120 to activate its tracking mode. The second terminal 120 responds thereto by displaying (operation 608) a query to a user to authorize initiation of the tracking mode and, responsive to the user's authorization, displaying an orientation pattern, such as the exemplary asymmetric light pattern 122-126 shown in FIG. 2.

The first terminal 100 identifies (operation 606) the orientation pattern on the second terminal 120 within the image stream from the camera 122. The first terminal 100 determines (operation 610) the relative orientation between the first and second terminals 100 and 120. The relative orientation can correspond to one or more angles that are determined between one or more defined axes through first and second terminals 100 and 120. The first terminal 100 transmits the relative orientation data (operation 612) to the second terminal 120.

The first terminal 100 displays (operation 614) on the display 124 an indication of the initial direction and distance to the second terminal 120. The second terminal 120 may similarly display (operation 616) an indication of the initial direction and distance to the first terminal 100.

The first terminal 100 then tracks its movement (operation 618) using acceleration data from the multi-axis accelerometer module 118. The second terminal 120 similarly tracks its movement (operation 630) using acceleration data from an accelerometer module, and further transmits (operation 632) its movement data to the first terminal 100.

The acceleration data that is transmitted from the second terminal 120 to the first terminal 100 may include raw acceleration data from the accelerometer module. Alternatively, the second terminal 120 may integrate the raw acceleration data over time to generate data that indicates an accumulated distance traveled by the second terminal 120 over an elapsed time and may transmit that distance data to the first terminal 100. By transmitting accumulated distance data instead of raw acceleration data, the bandwidth that is used to communicate the movement data to the first terminal 100 can be substantially decreased without substantially affecting the accuracy with which the first terminal 100 tracks the movement of the second terminal 120.

The first terminal 100 combines (operation 620) its movement data with the movement data that is received from the second terminal 120 to determine the present direction and distance between the first and second terminals 100 and 120. As described above, the first terminal 100 may further estimate the distance between the first and second terminals 100 and 120 based on strength of a signal that is received from the second terminal 120, such as the strength of the signal received from the second terminal 120 that carries the movement data. The first terminal 100 can combine the distance estimate that is based on the received signal strength with the distance that is determined based on acceleration data to improve the accuracy with which the distance between the first and second terminals 100 and 120 is determined.

The first terminal 100 can transmit (operation 622) to the second terminal 120 the data that indicates the relative direction and distance between the first and second terminals 100 and 120. The first terminal 100 displays (operation 624) on the display 124 an indication of the direction and the distance from the first terminal 100 to the second terminal 120. The second terminal 120 can similarly display (operation 634) on a display an indication of the direction and the distance from the second terminal 120 to the first terminal 100.

While the tracking mode is active, the first terminal 100 can continue to repeat the operations 618 through 624 (illustrated by collective operation 626) to dynamically determine the direction and distance from the first terminal 100 to the second terminal 120 as one or both of the terminals moves. The second terminal 120 can similarly repeat operations 630 through 636 (illustrated by collective operation 636) while the tracking mode is active to dynamically track and report its movements to the first terminal 100 and to display the relative direction and distance from the second terminal 120 to the first terminal 100.

Thus, by way of example, two users can quickly initialize the tracking mode by operating one of the terminals to take a picture of other terminal, thereby allowing automated detection of the relative orientation of the terminals. The users can then proceed to separately wander around a store, a theme park, or another venue while the terminals track their movements and while the users are presented with an indication of the direction and distance to one another. The users may thereby easily use their respective terminals to navigate back to one another. Because the terminals can track movement using acceleration data from the accelerometers, instead of using GPS signals and GPS receiver circuitry and positioning algorithms, the associated movement tracking circuitry can be less complex and, therefore, less expensive.

Moreover, because the terminals can communicate with one another through a short-range interface, such as a WLAN communication link, they may selectively operate independent of a cellular or other subscriber network and thereby avoid incurring added operational costs for the users. When the terminals communicate with one another through a long-range interface, such as through a cellular network, the terminals may be configured to selectively reduce the amount of data traffic that is communicated between the terminals so as to reduce the potential costs that are incurred by the users. Exemplary operations that may be carried out by the first terminal 100 and/or the second terminal 122 to selectively reduce the amount of data traffic that is communicated between the terminals while tracking movement are described below with regard to FIG. 7.

Figure 7:
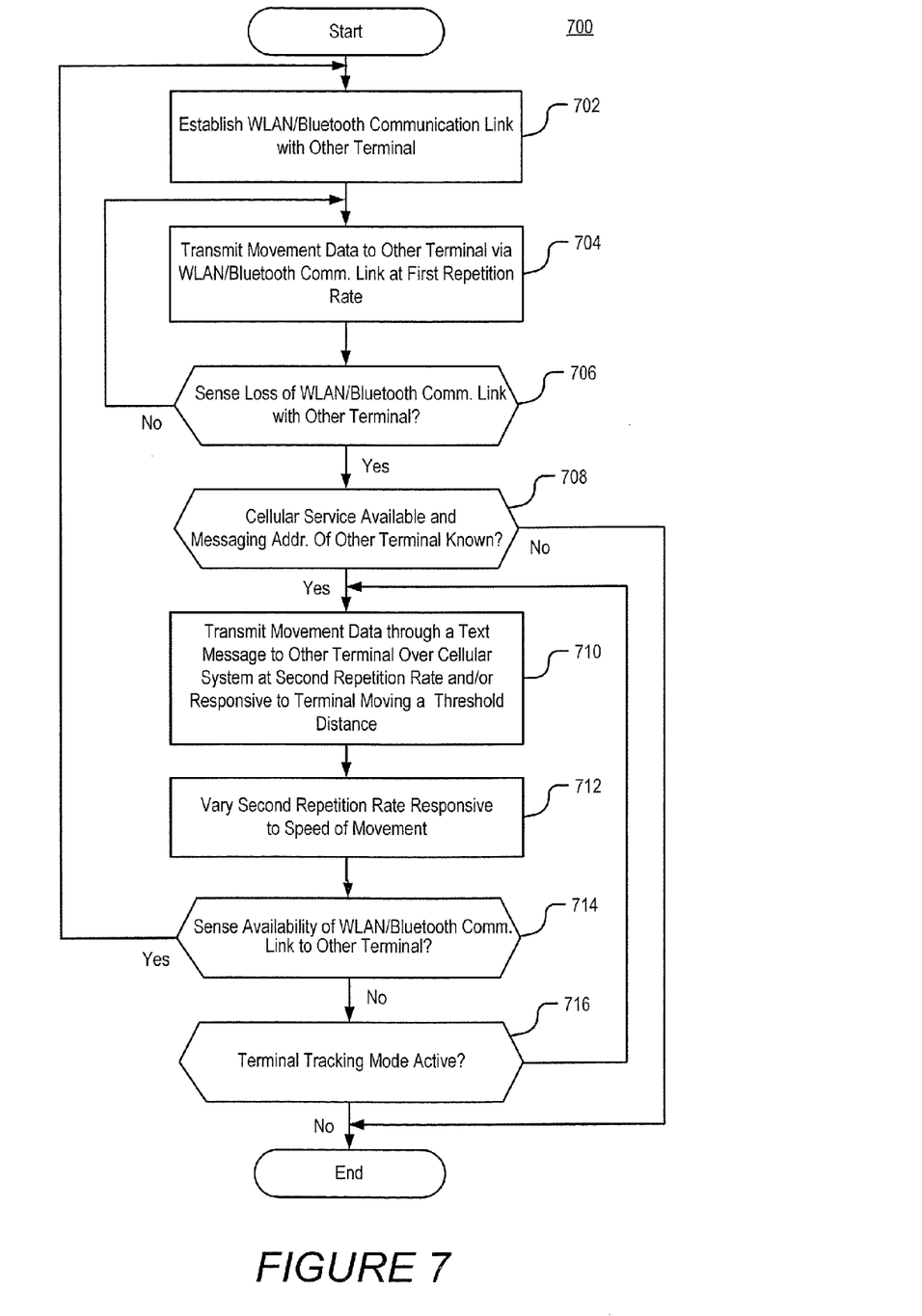
FIG. 7 is a flowchart that illustrates operations within a wireless communication terminal for transmitting movement data selectively through a short range transceiver or a cellular transceiver, and for regulating a repetition rate of the data transmissions in accordance with various embodiments of the invention.

FIG. 7 is a flowchart that illustrates operations 700 that can be carried out within the first terminal 100 and/or the second terminal 120 for transmitting movement data selectively through a WLAN/Bluetooth transceiver or a cellular transceiver based on availability of a WLAN/Bluetooth communication link, and for regulating a repetition rate of the data transmissions in accordance with various embodiments of the invention. For purposes of explanation only, the operations 700 are described below in the context of being carried out by the second terminal 120.

Referring to FIG. 7, the second terminal 120 establishes (operation 702) a WLAN/Bluetooth communication link with the first terminal 100. The second terminal 120 repetitively transmits (operation 704) its movement data to the first terminal 100 at a first repetition rate through the WLAN/Bluetooth communication link while the WLAN/Bluetooth communication link is present. In response to losing the WLAN/Bluetooth communication link (determined at operation 706), the second terminal 120 determines (operation 708) whether cellular service is available and whether it knows a messaging address of the first terminal 100. When cellular service is available and it knows a messaging address for the first terminal 100, the second terminal 120 begins transmitting its movement data through discrete text messages to the first terminal 100 through a cellular communication link at a second repetition rate that is less than the first repetition rate. Alternatively or additionally, the second terminal 120 can transmit its movement data through text messages to the first terminal 100 through the cellular communication link in response to determining that the second terminal has moved at least a threshold distance from a location where it last transmitted its movement data through a text message.

Although the transmission of the movement data through the WLAN/Bluetooth communication link is typically free to the users, such transmission through the cellular system generally incurs associated costs to the users. To reduce these costs, the second terminal 120 controls the second repetition rate so as to reduce the number of text messages that are used to communicate the movement data to the first terminal 100 through the cellular system. Accordingly, the second terminal 120 may communicate the movement data less frequently and/or may wait until it determines it is moved at least a threshold distance before it transmits new movement data to the first terminal 100 while it is communicating movement data through text messages via the cellular system.

Moreover, the second terminal 120 may determine its speed of movement and may vary (operation 712) the second repetition rate in response to the determined speed. Thus, while the second terminal 120 is moving at a relatively slow speed (e.g., below a first threshold speed), it may transmit it movement data less frequently through text messages, and may corresponding increase the frequency of its transmission through text messages when it is moving at a relative higher speed (e.g., above a second threshold speed).

The second terminal 120 can continue to search (operation 714) for the availability of the WLAN/Bluetooth communication link to the first terminal 100, and when it becomes available again, may reestablish (operation 702) a WLAN/Bluetooth communication link with the first terminal 100. While the tracking mode is active (determined at operation 716) and the WLAN/Bluetooth communication link is not available, the second terminal 120 may continue to repeat operations 710 through 716.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A first wireless communication terminal comprising:
   a display device;
   a wireless transceiver that is configured to communicate through an air interface with a second wireless communication terminal;
   at least one accelerometer that is configured to generate acceleration data responsive to movement of the first terminal; and
   a controller that is configured to generate movement data from the acceleration data that tracks movement of the first terminal, to communicate the movement data to the second terminal, to receive relative direction and distance data from the second terminal, and to respond thereto by causing an indication of direction and/or distance between the first and second terminals to be displayed on the display device,
   wherein the wireless transceiver comprises a wireless local area network (WLAN) transceiver and a cellular transceiver, and the controller is further configured to repetitively communicate the movement data to the second terminal through the WLAN transceiver while a WLAN communication link to the second terminal is available, and to respond to loss of the WLAN communication link by repetitively generating discrete text messages containing the movement data and communicating the text messages through the cellular transceiver to the second terminal,
   the controller is further configured to repetitively communicate the movement data to the second terminal at a first repetition rate through the WLAN transceiver while the WLAN communication link is available, and to respond to loss of the WLAN communication link by repetitively generating and communicating the text messages containing the movement data through the cellular transceiver at a second repetition rate that is less than the first repetition rate, and
   the controller is further configured to determine speed of the movement of the first terminal, and to regulate the second repetition rate at which the text messages containing the movement data are generated and communicated in response to the determined speed.

2. The first wireless communication terminal of claim 1, wherein the controller is further configured to communicate the message through the cellular transceiver to the second terminal each time the first terminal is determined to have moved at least a threshold distance from a location of the previous communicated message containing the movement data.

3. A first wireless communication terminal comprising:
a display device;
a wireless transceiver that is configured to communicate through an air interface with a second wireless communication terminal;
at least one accelerometer that is configured to generate acceleration data responsive to movement of the first terminal;
a controller that is configured to generate movement data from the acceleration data that tracks movement of the first terminal, to receive movement data from the second terminal that tracks movement of the second terminal, to combine the movement data for the first and second terminals to generate relative direction and distance data between the first and second terminals, and to cause an indication of direction and/or distance between the first and second terminals to be displayed on the display device; and
an image sensor,
wherein the controller is configured to detect orientation of a defined pattern on the second terminal within image data from the image sensor, to determine an initial relative orientation between the first and second terminals responsive to the detected orientation of the defined pattern on the second terminal, and to track its rotational movement relative to the initial relative orientation to generate the relative direction between the first and second terminals after the first and second terminals have been moved apart outside the viewable space of the image sensor.

4. A first wireless communication terminal comprising:
a display device;
a wireless transceiver that is configured to communicate through an air interface with a second wireless communication terminal;
at least one accelerometer that is configured to generate acceleration data responsive to movement of the first terminal; and
a controller that is configured to generate movement data from the acceleration data that tracks movement of the first terminal, to receive movement data from the second terminal that tracks movement of the second terminal, to combine the movement data for the first and second terminals to generate relative direction and distance data between the first and second terminals, and to cause an indication of direction and/or distance between the first and second terminals to be displayed on the display device,
wherein the wireless transceiver comprises a wireless local area network (WLAN) transceiver and a cellular transceiver, and the controller is further configured to repetitively communicate the relative direction and distance data to the second terminal through the WLAN transceiver while a WLAN communication link to the second terminal is available, and to respond to loss of the WLAN communication link by repetitively generating discrete text messages containing the relative direction and distance data and communicating the text messages through the cellular transceiver to the second terminal,
wherein the controller is further configured to repetitively communicate the relative direction and distance data to the second terminal at a first repetition rate through the WLAN transceiver, and, in response to loss of the WLAN communication link, to repetitively generate and communicate the text messages containing the relative direction and distance data through the cellular transceiver at a second repetition rate that is less than the first repetition rate,
wherein the controller is further configured to determine speed of the movement of the first terminal, and to regulate the second repetition rate at which the text messages containing the relative direction and distance data communicated in response to the determined speed.

5. The first wireless communication terminal of claim 4, further comprising an image sensor, wherein the controller is configured to detect orientation of a defined pattern on the second terminal within image data from the image sensor, and to determine relative orientation between the first and second terminals responsive to the detected orientation of the defined pattern on the second terminal.

6. The first wireless communication terminal of claim 5, wherein the controller is configured to detect orientation of a light pattern emitted by the second terminal within image data from the image sensor, and to determine relative orientation between the first and second terminals responsive to the detected orientation of the light pattern.

7. The first wireless communication terminal of claim 5, wherein the controller is configured to detect orientation of a pattern displayed on a display device of the second terminal within image data from the image sensor, and to determine relative orientation between the first and second terminals responsive to the detected orientation of the displayed pattern on the second terminal.

8. The first wireless communication terminal of claim 4, wherein the controller is further configured to transmit the relative direction and distance data to the second terminal.

9. The first wireless communication terminal of claim 4, wherein the controller is further configured to determine signal strength for a received signal carrying the movement data from the second terminal, to estimate distance between the first and second terminals in response to a defined relationship between a known strength of the signal transmitted by the second terminal and the received signal strength, and to use the estimated distance to increase accuracy of the relative direction and distance data that is generated using the movement data for the first and second terminals.

10. A method comprising:
at a first wireless communication terminal, generating movement data from acceleration data that tracks movement of the first terminal;
at the first terminal, receiving movement data from a second wireless communication terminal that tracks movement of the second terminal;
at the first terminal, combining the movement data for the first and second terminals to generate relative direction and distance data between the first and second terminals;
displaying at the first terminal an indication of direction and/or distance between the first and second terminals;
detecting orientation of a defined pattern on the second terminal within image data from an image sensor in the first terminal;
determining relative orientation between the first and second terminals responsive to the detected orientation of the defined pattern on the second terminal;

repetitively communicating the relative direction and distance data to the second terminal at a first repetition rate through a WLAN transceiver in the first terminal while a WLAN communication link to the second terminal is available, and responding to loss of the WLAN communication link by repetitively generating discrete text messages containing the relative direction and distance data and communicating the text messages through a cellular transceiver in the first terminal to the second terminal at a second repetition rate that is less than the first repetition rate; and regulating the second repetition rate at which the text messages containing the relative direction and distance data are communicated in response to speed of the movement of the first terminal and/or in response to determining that the first terminal has moved at least a threshold distance from a location of the previous communicated message containing the movement data.

* * * * *